(12) United States Patent
Gstach et al.

(10) Patent No.: US 9,933,002 B2
(45) Date of Patent: Apr. 3, 2018

(54) EXPANSION ANCHOR WITH A SWELLING ELEMENT FOR SECURING THE SLEEVE

(71) Applicant: Hilti Aktiengesellschaft, Schaan (LI)

(72) Inventors: Peter Gstach, Schaan (LI); Ronald Mihala, Feldkirch (AT); Bernhard Winkler, Feldkirch (AT)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 15/037,459

(22) PCT Filed: Nov. 25, 2014

(86) PCT No.: PCT/EP2014/075456
§ 371 (c)(1),
(2) Date: May 18, 2016

(87) PCT Pub. No.: WO2015/075252
PCT Pub. Date: May 28, 2015

(65) Prior Publication Data
US 2016/0290379 A1    Oct. 6, 2016

(30) Foreign Application Priority Data

Nov. 25, 2013 (EP) ...................................... 13194193

(51) Int. Cl.
*F16B 13/06* (2006.01)
*F16B 13/08* (2006.01)

(52) U.S. Cl.
CPC ............ *F16B 13/065* (2013.01); *F16B 13/06* (2013.01); *F16B 13/0858* (2013.01)

(58) Field of Classification Search
CPC ...... F16B 13/004; F16B 13/045; F16B 13/06; F16B 13/065; F16B 13/0841; F16B 13/0858; F16B 13/0875; F16B 2013/006

USPC ................................ 411/44, 54, 60.1, 65, 70
See application file for complete search history.

(56) References Cited

U.S. PATENT DOCUMENTS

| | | | | |
|---|---|---|---|---|
| 2,718,691 A | * | 9/1955 | Sussenbach | F16B 43/001 156/293 |
| 3,208,135 A | * | 9/1965 | Newbold | F16B 12/12 29/432 |
| 4,656,806 A | * | 4/1987 | Leibhard | F16B 13/065 411/15 |
| 4,681,493 A | * | 7/1987 | Vollmer | F16B 13/066 411/19 |
| 4,906,148 A | * | 3/1990 | Schule | E04D 3/3603 411/34 |
| 4,968,200 A | * | 11/1990 | Mark | F16B 13/065 411/55 |

(Continued)

FOREIGN PATENT DOCUMENTS

| | | |
|---|---|---|
| CN | 88101029 A | 8/1988 |
| CN | 102652226 A | 8/2012 |

(Continued)

*Primary Examiner* — Roberta S Delisle
(74) *Attorney, Agent, or Firm* — Davidson, Davidson & Kappel, LLC

(57) ABSTRACT

An expansion anchor including a stud and at least one expansion element arranged on the stud, whereby the stud has a slanted surface that pushes the expansion element radially outwards when the stud is moved in a pull-out direction, relative to the expansion element is provided. It is provided that the expansion anchor has at least one swelling element consisting of a swellable compound that can swell in order to secure the expansion element onto the wall of a drilled hole in the pull-out direction.

9 Claims, 2 Drawing Sheets

(56) References Cited

U.S. PATENT DOCUMENTS

| | | | | |
|---|---|---|---|---|
| 4,983,082 A | * | 1/1991 | Mark | F16B 13/065 411/55 |
| 5,176,481 A | | 1/1993 | Schiefer | |
| 5,314,277 A | * | 5/1994 | Fischer | F16B 13/063 411/44 |
| 7,857,564 B2 | * | 12/2010 | Wieser | F16B 13/065 411/354 |
| 8,444,355 B2 | * | 5/2013 | Gaudron | F16B 13/065 411/37 |
| 8,974,162 B2 | * | 3/2015 | Shimahara | B21H 3/022 411/44 |
| 2004/0096288 A1 | * | 5/2004 | Haug | F16B 13/065 411/57.1 |
| 2007/0098518 A1 | | 5/2007 | Rosenkranz | |
| 2008/0050195 A1 | * | 2/2008 | Wieser | F16B 13/065 411/44 |
| 2010/0111639 A1 | * | 5/2010 | Gaudron | F16B 13/065 411/354 |
| 2012/0237313 A1 | | 9/2012 | Bohnet et al. | |
| 2012/0311947 A1 | * | 12/2012 | Van Wissen | F16B 13/066 52/250 |

FOREIGN PATENT DOCUMENTS

| | | | |
|---|---|---|---|
| DE | 4125577 | A1 | 2/1993 |
| EP | 0 167 481 | A1 | 1/1986 |
| EP | 0167481 | A | 1/1986 |
| EP | 0 514 342 | A1 | 11/1992 |
| EP | 0514342 | A1 | 11/1992 |

* cited by examiner

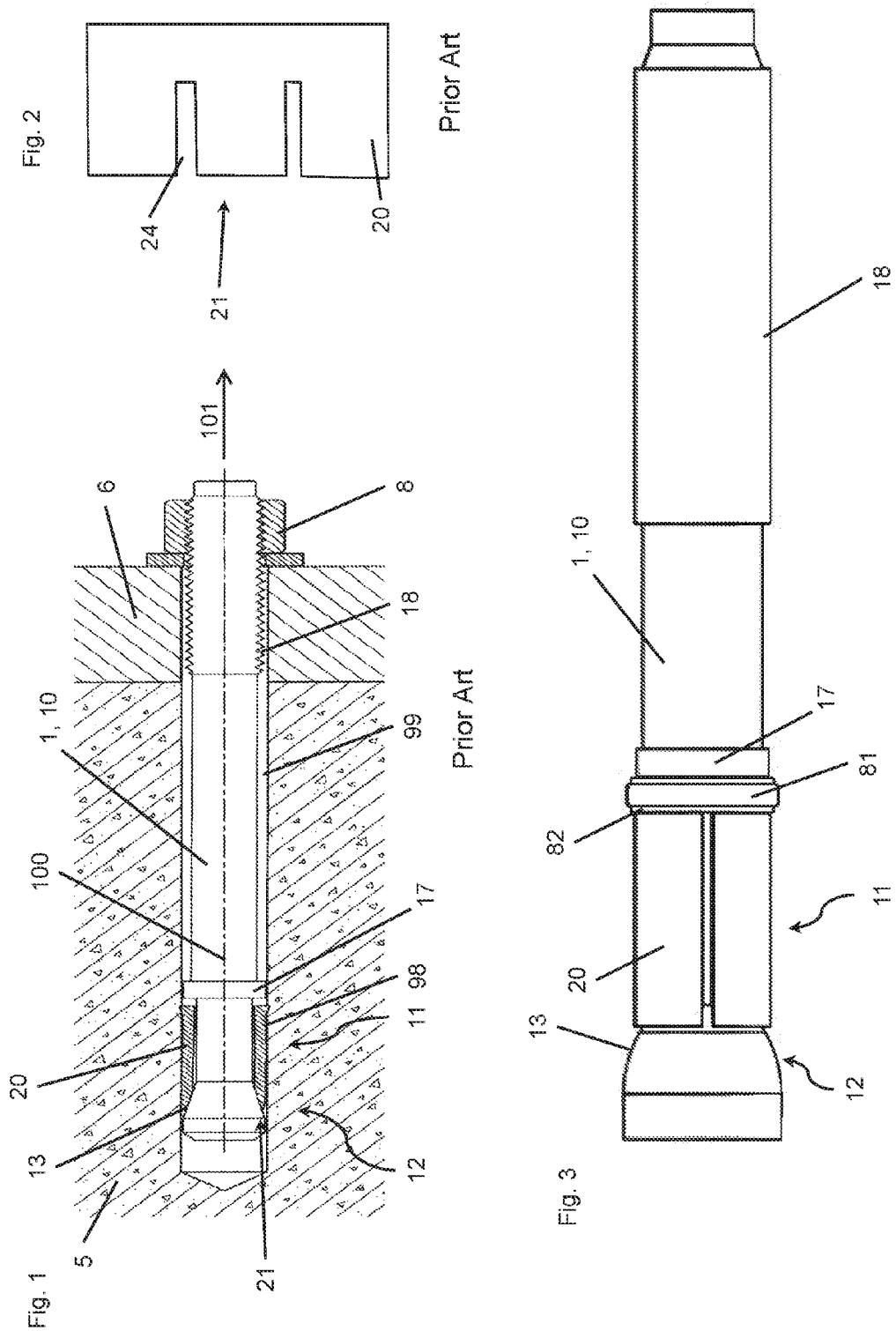

EXPANSION ANCHOR WITH A SWELLING ELEMENT FOR SECURING THE SLEEVE

The invention relates to an expansion anchor, especially one that is to be secured in a hole drilled in a concrete substrate. Such an expansion anchor is fitted with a stud and at least one expansion element arranged on the stud, whereby the stud has a slanted surface that pushes the expansion element on the stud radially outwards when the stud is moved in a pull-out direction relative to the expansion element.

BACKGROUND

An expansion anchor of the generic type is disclosed, for example, in European patent application EP 0 514 342 A1. Such an anchor is used to anchor components in a hole drilled in a solid substrate, for example, in concrete. The prior-art expansion anchor has an elongated stud whose front end has a conical expanding section that widens counter to the pull-out direction. Offset relative to the expanding section, there is an expansion sleeve that is mounted so as to be movable counter to the pull-out direction. The expansion sleeve has elevations on the outside which protrude in the radial direction and with which the expansion sleeve can dig into the inner wall of the hole drilled in the substrate. The expansion anchor, with the expansion section facing forward, is hammered into the drilled hole counter to the pull-out direction, and subsequently, the stud is once again pulled somewhat out of the drilled hole in the pull-out direction. Once the expansion anchor has been hammered in, the expansion sleeve digs into the inner wall of the drilled hole, as a result of which it is held back in the drilled hole when the stud is pulled out. Consequently, the expanding section of the stud is pulled into the expansion sleeve, a process in which, due to the increasing diameter of the expanding section, the expansion sleeve is widened and the expansion anchor with its expansion sleeve is clamped in the substrate so that loads can be transferred into the substrate. This basic principle can preferably be implemented in the invention as well.

In order to ensure a reliable widening of the expansion anchor, movements of the expansion sleeve when the stud is initially pulled out should be prevented. For this purpose, according to European patent application EP 0 514 342 A1, elevations are provided on the expansion sleeve which affix the sleeve after the expansion anchor has been hammered into the drilled hole. However, the larger these elevations are, the more difficult it can be to hammer the anchor into the drilled hole. Consequently, the holding force that can be achieved with elevations often means that a compromise has to be accepted when it comes to the behavior of the anchor when it is being hammered in.

European patent application EP 0 167 481 A1 describes an expansion anchor which can be anchored in a substrate under axial pre-tensioning and with which a counter-bearing is tensioned against the substrate, whereby, between the counter-bearing and the substrate, there is a can-like container that can be extended along the longitudinal axis of the anchor and that has a cavity for a swellable compound. When this compound swells up, it can then maintain the pre-tensioning of the anchor.

SUMMARY OF THE INVENTION

It is an object of the present invention to provide a particularly reliable expansion anchor with which very good load values can be achieved with very little effort.

The present invention provides an expansion anchor that has at least one swelling element consisting of a swellable compound that can swell in order to secure the expansion element onto the wall of a drilled hole, especially a cylindrical one, in the pull-out direction.

A basic idea of the invention can be seen in that a swelling element consisting of a swellable compound that is made to swell inside the drilled hole is arranged on the anchor. During this swelling process, the swelling element presses against the cylindrical wall of the drilled hole, thereby increasing the friction between the swelling element and the wall of the drilled hole, and thus also increasing the friction between the expansion element, which is operationally connected to the swelling element, and the wall of the drilled hole. This ensures that the expansion element is axially secured in the drilled hole against being pulled out in the pull-out direction. Consequently, according to the invention, very high holding forces can be achieved between the expansion element and the wall of the drilled hole, even in cracked concrete, thus achieving a very reliable expansion process. Since, according to the invention, very high holding forces can be achieved between the expansion element and the wall of the drilled hole, an anchor according to the invention can also be designed so as to have a high coefficient of friction between the expansion element and the stud, without running the risk that the expansion element will move axially during installation. This high coefficient of friction between the expansion element and the stud, in turn, can ensure very high pull-out loads on the installed anchor, especially in cracked concrete as well.

A major advantage of the invention is that the swellable compound cannot be activated until the anchor has been hammered into the drilled hole, so that the high holding forces between the expansion element and the wall of the drilled hole only occur after the anchor has been hammered in. Consequently, in spite of the high holding forces between the expansion element and the wall of the drilled hole, the anchor can be easily hammered in. In this manner, the invention remedies the compromise encountered in the anchors known from the state of the art, which entails that high holding forces of the expansion element also call for high elevations on the sleeve and thus high hammering forces.

The expansion element and/or the stud is/are preferably made of a metal that can also be coated for purposes of influencing the friction in a targeted manner. According to the invention, the expansion element is arranged on the stud so that it can be moved along it lengthwise. Whenever the terms "radial" and "axial" are employed here, these refer especially to the longitudinal axis of the stud and/or of the expansion anchor, which can especially be the axis of symmetry or the center axis of the stud or of the expansion anchor. In particular, the expansion anchor can be a force-controlled expanding expansion anchor.

According to the invention, the expansion element is pushed radially outwards by the slanted surface of the stud, as a result of which it presses against the wall of the hole drilled in the substrate when the stud is moved axially in the pull-out direction of the stud relative to the expansion element. This anchors the expansion anchor in the drilled hole. Preferably, the pull-out direction runs parallel to the longitudinal axis of the stud and/or it faces out of the drilled hole. The distance from the longitudinal axis of the stud increases on the slanted surface counter to the pull-out direction.

According to the invention, swelling can refer to a chemical process, a physical process or a mixed process. According to the invention, swelling preferably refers to any process in which the addition of an activating substance, especially a liquid, leads to a volume increase of the swelling element, said which is preferably configured as a solid body.

The expansion element can be, for instance, a wedge. However, it is especially preferable for the expansion element to be an expansion sleeve that surrounds the stud at least in certain areas, and/or for the stud to have an expansion cone, whereby the slanted surface is formed by the expansion cone. This translates into a particularly uniform introduction of the force in the circumferential direction. According to the invention, the expansion cone is provided in order to expand the expansion sleeve, that is to say, to radially widen the expansion sleeve. One or more expansion elements can be provided.

According to the invention, the stud can have a load-absorbing means, which can especially be configured as an external thread or as an internal thread. The load-absorbing means is such that the tensile forces that are oriented in the pull-out direction can be introduced into the anchor. Advantageously, the slanted surface is arranged in a first end area of the stud while the load-absorbing means is arranged in second end area of the stud opposite from the first end area. In particular, the directional vector of the pull-out direction can be oriented from the slanted surface towards the load-absorbing means. On the slanted surface, the distance of the surface of the stud from its longitudinal axis increases as the distance from the load-absorbing means increases.

In particular, the invention can be used for so-called stud anchors, in which the expansion sleeve does not extend out of the drilled hole. After all, in the case of such stud anchors, the expansion process is greatly influenced by the friction between the expansion element and the wall of the drilled hole. Accordingly, a stop can be formed on the stud that serves to limit movement of the expansion element away from the slanted surface. In the case of a stud anchor, such a stop can very easily ensure that the expansion element, together with the stud, reliably penetrates into the drilled hole. Preferably, the stop is configured as an annular shoulder which can be advantageous in terms of its production as well as of its reliability. In particular, the stop is arranged axially between the slanted surface and the load-absorbing means.

Fundamentally speaking, the swelling element can be arranged directly on the expansion element. However, it is especially advantageous for the expansion anchor to have a fixation element, whereby the swelling element is arranged on the fixation element. If the swelling element is arranged on a fixation element that is specially provided for this purpose and that is separate from the expansion sleeve, the individual functionalities of the anchor can be distributed among several parts. This reduces the production effort and/or allows the reliability to be increased even further, especially since the swellable compound can be located at a distance from the part of the anchor that is pushed radially outwards. Advantageously, the fixation element is arranged on the stud axially between the expansion element and the stop and/or between the expansion element and the load-absorbing means.

Preferably, the fixation element can be in contact with the expansion element. This yields a very simple design. Suitably, the fixation element is arranged on the stud so as to be axially movable, which can reduce the design effort even further. In particular, the above-mentioned stop, which limits movement of the expansion element away from the slanted surface, can also limit movement of the fixation element and/or of the swelling element away from the slanted surface.

An advantageous embodiment provides that the fixation element is a fixation ring and/or that the swelling element is in the form of a ring or a ring segment. This translates into a very uniform introduction of force. The fixation ring can also be interrupted, which can be advantageous form the standpoint of its production. The fixation element can be made of a metal, especially of steel.

It is likewise advantageous for the expansion anchor, especially its fixation element, to have a cavity in which the swelling element is accommodated at least in certain areas. This makes it possible to very easily prevent the swelling element from shearing off the anchor when the latter is being hammered in. If the fixation element is a fixation ring, the cavity can especially be an annular groove that encircles the stud.

It can preferably be provided that the swelling element can be activated when the expansion anchor is inserted into the drilled hole. Towards this end, for example, the activating substance for the swelling element can be arranged in a closed container on the expansion anchor, especially on the swelling element, whereby the container breaks open and releases the activating substance when the expansion anchor is inserted into the drilled hole. The swelling element can protrude beyond the cross section of the stop, so that the swelling element is mechanically stressed and can thus be activated during the hammering-in procedure. Fundamentally, speaking, the activating substance for the swelling element can also be placed into the drilled hole separately.

BRIEF DESCRIPTION OF THE DRAWINGS

The invention will be explained in greater detail below on the basis of preferred embodiments that are schematically shown in the accompanying figures, whereby, within the scope of the invention, individual features of the embodiments shown below can fundamentally be implemented, either on their own or in any desired combination. The following is shown schematically in the figures:

FIG. 1 a partial longitudinal sectional view of an expansion anchor according to the state of the art that has been installed in a concrete substrate;

FIG. 2 a developed view of the inside of the expansion sleeve of the expansion element of the anchor shown in FIG. 1;

FIG. 3 a side view of an expansion anchor according to the invention; and

DETAILED DESCRIPTION

Figure 4:
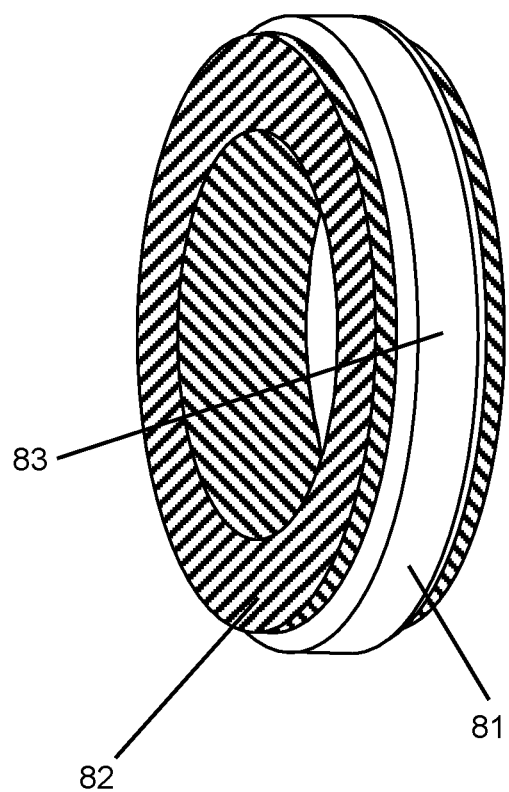
FIG. 4 a perspective view of the fixation element, with the swelling element of the expansion anchor according to the invention as shown in FIG. 3.

Elements that have an identical effect are designated by the same reference numerals in the figures.

FIGS. 1 and 2 show an embodiment of an expansion anchor 1 according to the state of the art. As can especially be seen in FIG. 1, the expansion anchor 1 has a stud 10 and an expansion element 20, which is configured as an expansion sleeve, whereby the expansion sleeve surrounds the stud 10. The stud 10 has a neck section 11 with a constant cross section and, adjoining the neck section 11, in the area of the front end of the stud 10, it has an expansion cone 12 for the expansion sleeve 20 on which the of the stud 10 surface is formed as a slanted surface 13, and on which the stud 10, starting at the neck section 11, widens towards its front end. On the side of the neck section 11 facing away from the expansion cone 12, the stud 10 has a stop 17—configured, for instance, as an annular shoulder—for the expansion sleeve 20. At its rear end section opposite from the expansion cone 12, the stud 10 is provided with an external thread 18 for a nut 8.

As can especially be seen in FIG. 2, the expansion sleeve 20 has expansion slits 24 that project from the front face 21 of the expansion sleeve 20. These expansion slits 24 serve to facilitate the radial widening of the expansion sleeve 20 by the expansion cone 12 of the stud 10.

When the expansion anchor 1 is being installed, the stud 10, with the expansion cone 12 facing forward, is pushed in the direction of the longitudinal axis 100 of the stud 10 into a hole 99 drilled in the substrate 5 shown in FIG. 1. In this process, owing to the stop 17, which limits movement of the expansion element 20 away from the expansion cone 12, the expansion element 20 that is configured as an expansion sleeve is also inserted the drilled hole 99. Then, for instance, through the tightening of the nut 8, the stud 10 is once again pulled somewhat out the drilled hole 99 in the pull-out direction 101 that runs parallel to the longitudinal axis 100. Owing to its friction against the essentially cylindrical wall 98 of the drilled hole 99, the expansion element 20, which is configured as an expansion sleeve, is left behind, as a result of which the stud 10 moves relative to the expansion element 20. During this movement, the slanted surface 13 of the expansion cone 12 of the stud 10 penetrates ever-deeper into the expansion element 20 in such a way that the expansion element 20 is radially widened by the slanted surface 13 and pressed against the wall 98 of the drilled hole 99. Owing to this mechanism, the expansion anchor 1 is affixed in the substrate 5. The installed state of the expansion anchor 1, in which it is affixed in the substrate 5, is shown in FIG. 1. The nut 8 can be used to secure an add-on part 6 to the substrate 5.

One embodiment of an expansion anchor according to the invention is shown in FIGS. 3 and 4. The embodiment according to the invention as shown in FIGS. 3 and 4 achieves a number of features of the embodiment shown in FIGS. 1 and 2 in an analogous manner, so that the above-mentioned description can thus be applied analogously, so that only the differences according to the invention will be elaborated upon below.

The embodiment according to the invention as shown in FIGS. 3 and 4 differs from the embodiment according to the state of the art as shown in FIGS. 1 and 2 essentially in that, in the case of the embodiment according to the invention as shown in FIGS. 3 and 4, there is an additional fixation element 82 with a swelling element 81 containing a swellable compound. The fixation element 82 is arranged on the stud 10 so as to be axially movable in the neck section 11 of the stud 10 between the expansion element 20 and the stop 17. It is configured so as to be ring-shaped in the form of a fixation ring that surrounds the stud and it has an encircling groove 83 in which the likewise ring-shaped swelling element 81 is partially accommodated, namely, with a radial overhang towards the outside. The diameter of the fixation element 82 with the swelling element 81 is slightly larger than the stop 17 so that the swelling element 81 can be activated when the expansion anchor 1 is inserted into a drilled hole 99.

When the expansion anchor 1 is being inserted into the drilled hole 99, the swellable compound of the swelling element 81 is activated, as a result of which it presses radially against the wall 98 of the drilled hole 99. In this manner, the fixation element 82 with the swelling element 81 is axially secured onto the wall 98 of the drilled hole. Consequently, the expansion element 20, which is supported on the fixation element 82, is axially secured in the drilled hole 99, so that the expansion element 20 is reliably secured in the drilled hole 99 when the stud 10 is moved in the pull-out direction 101 relative to the expansion element 20 during the installation of the anchor 1.

What is claimed is:

1. An expansion anchor comprising:
   a stud; and
   at least one expansion element arranged on the stud,
   the stud having a slanted surface pushing the expansion element on the stud radially outwards when the stud is moved in a pull-out direction relative to the expansion element;
   the expansion anchor having at least one swelling element including a swellable compound swellable in order to secure the expansion element onto a wall of a drilled hole in the pull-out direction.

2. The expansion anchor as recited in claim 1 wherein that expansion element is an expansion sleeve surrounding the stud at least in certain areas, the stud having an expansion cone, the slanted surface being formed by the expansion cone.

3. The expansion anchor as recited in claim 1 wherein the stud has a stop serving to limit movement of the expansion element away from the slanted surface, the expansion anchor having a fixation element arranged so as to be axially moveable on the stud between the expansion element and the stop, the swelling element being arranged on the fixation element.

4. The expansion anchor as recited in claim 3 wherein the stop is an annular shoulder.

5. The expansion anchor as recited in claim 3 wherein the fixation element is a fixation ring or the swelling element is in the form of a ring or a ring segment.

6. The expansion anchor as recited in claim 1 wherein the expansion anchor has a cavity, the swelling element being accommodated in the cavity at least in certain areas.

7. The expansion anchor as recited in claim 1 wherein the swelling element is activatable when the expansion anchor is inserted into the drilled hole.

8. The expansion anchor as recited in claim 1 wherein the swelling element is a chemical swelling element.

9. The expansion anchor as recited in claim 1 wherein the swelling element has an unactivated volume and an activated volume, the activated volume being larger than the unactivated volume.

* * * * *